United States Patent
Lin (10) Patent No.: US 9,037,765 B2
(45) Date of Patent: May 19, 2015

(54) DATA TRANSMISSION SELECTION CIRCUIT AND METHOD

(71) Applicant: ASKEY COMPUTER CORP., New Taipei (TW)

(72) Inventor: Hsing-Nan Lin, New Taipei (TW)

(73) Assignee: ASKEY COMPUTER CORP. (TW)

( * ) Notice: Subject to any disclaimer, the term of this patent is extended or adjusted under 35 U.S.C. 154(b) by 373 days.

(21) Appl. No.: 13/743,529

(22) Filed: Jan. 17, 2013

(65) Prior Publication Data

US 2014/0133484 A1 May 15, 2014

(30) Foreign Application Priority Data

Nov. 13, 2012 (TW) .............................. 101142171 A (51) Int. Cl.
*G06F 13/00* (2006.01)
*H04Q 11/00* (2006.01)

(52) U.S. Cl.
CPC ..................................... *H04Q 11/00* (2013.01)

(58) Field of Classification Search
CPC .............. G06F 13/4086; G06F 13/385; G06F 13/4027; G06F 13/4072; G06F 13/409; G06F 13/4022; G06F 3/0601; G06F 3/0635; G06F 3/0689
USPC .................................................. 710/100, 316
See application file for complete search history.

(56) References Cited

U.S. PATENT DOCUMENTS

| | | | | |
|---|---|---|---|---|
| 5,583,999 A * | 12/1996 | Sato et al. | ...................... | 710/100 |
| 5,619,722 A * | 4/1997 | Lovrenich | .......................... | 710/2 |
| 5,809,280 A * | 9/1998 | Chard et al. | ................... | 711/160 |
| 6,233,661 B1 * | 5/2001 | Jones et al. | .................... | 711/154 |
| 6,434,637 B1 * | 8/2002 | D'Errico | .......................... | 710/38 |
| 6,802,021 B1 * | 10/2004 | Cheng et al. | .................. | 714/4.11 |
| 7,508,752 B1 * | 3/2009 | Heflin | ........................... | 370/217 |
| 2003/0065871 A1 * | 4/2003 | Casper et al. | ................. | 710/316 |
| 2009/0010320 A1 * | 1/2009 | Hollis | ........................... | 375/232 |

FOREIGN PATENT DOCUMENTS

| | | | | |
|---|---|---|---|---|
| EP | 0195589 A2 * | 9/1986 | ............... | H04Q 3/54 |
| JP | 04196861 A * | 7/1992 | ............ | H04M 11/00 |
| JP | 2004179420 A * | 6/2004 | ............ | H01L 21/822 |

* cited by examiner

*Primary Examiner* — Faisal M Zaman
(74) *Attorney, Agent, or Firm* — Schmeiser, Olsen & Watts, LLP (57) ABSTRACT

A data transmission selection circuit and method select one of data transmission lines between a mother system and daughter systems and transmit data via the selected transmission line. The circuit includes an inputting module, an outputting module, a switching unit, and a processing unit. The inputting module receives and sends the data. to the switching unit and the outputting module. The processing unit receives a previous switching status data (indicating that one of the data transmission lines and one of the daughter systems are connected and) created by a previous data transmission selection circuit. After analyzing the previous switching status data with an algorithm, the processing unit determines a switching status data. different from the previous switching status data, such that the switching unit connects another one of the data transmission lines and another one of the daughter systems according to the switching status data.

11 Claims, 5 Drawing Sheets

DATA TRANSMISSION SELECTION CIRCUIT AND METHOD

CROSS-REFERENCE TO RELATED APPLICATION

This non-provisional application claims priority under 35 U.S.C. §119(a) on Patent Application No(s).101142171 filed in Taiwan, R.O.C. on Nov. 13, 2012, the entire contents of which are hereby incorporated by reference.

FIELD OF TECHNOLOGY

The present invention relates to data transmission selection circuits and methods, and more particularly, to a data transmission selection circuit and method for selecting one of a plurality of data transmission lines and transmitting data o the selected transmission line between a mother system and a plurality of daughter systems.

BACKGROUND

According to the prior art, video converters (or known as set-top boxes) receive digital video signals and then perform related processes (including demodulation, decompression, and digital-to-analog conversion) on the digital video signals, such that the digital video signals are turned into analog video signals perceivable by the human eyes.

The sources of digital information are increasingly diversified; hence, conventional video converters are serving ever-increasing purposes, for example, receiving digital broadcast or reading multimedia digital data from a storage device, such as a hard disk drive.

In general, conventional the video converters each come with an optional connector for connecting to an expansion daughter system required for installation of an expansion product, such as a digital broadcast receiver or a storage device. Furthermore, the expansion daughter system can be provided in plurality, such that the expansion daughter systems are connected in series and adapted to store the multimedia digital data.

During the process of connecting the expansion daughter systems in series, if the same data transmission line is employed, a plurality of data will be simultaneously transmitted on the same data transmission line for certain to thereby subject the data to mutual interference. The interference is likely to cause the video converters or the expansion daughter systems to operate wrongly.

To overcome the aforesaid drawbacks of the prior art, persons skilled in the art put forth a conventional solution whereby the user configures and specifies that each of the expansion daughter systems transmits data by means of a specific data transmission path. However, from the user's perspective, the aforesaid configuration lacks ease of use.

Accordingly, it is imperative to provide a system and method for eliminating the aforesaid drawbacks.

SUMMARY

It is an objective of the present invention to provide a data transmission selection circuit which allows a plurality of daughter systems to series-connect to a mother system, and enables data transmission between the mother system and the daughter systems, so as to prevent signal interference which might otherwise occur between data being sent to the daughter systems simultaneously through the same transmission line.

Another objective of the present invention is to provide a data transmission selection method for selecting an available data transmission line during an expansion-oriented connection process of a mother system and daughter systems, such that the mother system is connected to one of the daughter systems by the data transmission line.

In order to achieve the above and other objectives, the present invention provides a data transmission selection circuit for selecting one of a plurality of data transmission lines between a mother system and a plurality of daughter systems and transmitting data by the selected transmission line. The data transmission selection circuit comprises an inputting module, an outputting module, a switching unit, and a processing unit. The inputting module has a plurality of first input ports, a first detection port, and a first data port. The first input ports connect to the data transmission lines. The first detection port receives a previous switching status data. The first data port receives a trigger signal. The outputting module has a plurality of first output ports, a second detection port and a second data port. The first output ports connect to the first input ports, respectively. The second data port is connected to the first data port. The switching unit has a plurality of second input ports, a second output port and a selection port. A plurality of paths is created between the second input ports and the second output port. The second input ports connect to the first input ports, respectively. The switching unit selects one of the paths based on a switching signal received by the selection port. The processing unit has a receiving terminal, a data terminal, a control terminal, and an output terminal. The receiving terminal connects to the first detection ports. The data terminal connects to the first data ports. The control terminal connects to the selection ports. The output terminal connects to the second detection ports. After the data terminal has received the trigger signal, the processing unit analyzes the previous switching status data at the receiving terminal with an algorithm, so as to determine a switching status data different from the previous switching status data. The processing unit generates the switching signal based on the switching status data and sends the switching signal to the control terminal The processing unit sends the switching status data to the output terminal, wherein the previous switching status data is indicative of a state required for a previous data transmission selection circuit or the mother system to select one of the paths, and wherein the switching status data is indicative of a state required for a next data transmission selection circuit to identify another said path selected by the switching unit.

In order to achieve the above and other objectives, the present invention provides a data transmission selection method, characterized in that connection of a data transmission selection circuit and a next data transmission selection circuit enables selection of one of a plurality of data transmission lines and thereby transmission of data between a mother system and a plurality of daughter systems by the selected data transmission line, the data transmission selection circuits each being defined with an intermediate path and a next path, the method comprising the steps of: (a) selecting the immediate path by the immediate data transmission selection circuit to thereby connect one of the data transmission lines and one of the daughter systems by the immediate path; (b) sending by the mother system the data from one of the data transmission lines to one of the daughter systems by the immediate path; (c) setting by the immediate data transmission selection circuit a usage status of having selected the immediate path to a path usage status, and creating by the immediate data transmission selection circuit a switching status data based on the path usage status; (d) sending the switching status data to the next data transmission selection circuit, so as for the next data transmission selection circuit to identify that the immediate data transmission selection circuit has selected the path usage status of the immediate path; (e) selecting the next path by the next data transmission selection circuit based on the path usage status, so as for the next path to connect another one of the data transmission lines and another one of the daughter systems, wherein the next data transmission selection circuit sets a usage status of having selected the next path to another path usage status, the next data transmission selection circuit creates another switching status data based on the another path usage status; and (f) sending by the mother system the data from the another one of the data transmission lines to the next data transmission selection circuit via the immediate data transmission selection circuit, and then sending the data from the next data transmission selection circuit to another one of the daughter systems via the next path.

Compared with the prior art, the present invention provides a data transmission selection circuit and method for enabling a mother system to expand a plurality of daughter systems in a manner that an available data transmission line can be selected, such that the present invention overcomes a drawback of the prior art, that is, data interference arising from the sharing of a single data transmission line by and between multiple daughter systems.

To enable connection of a plurality of data transmission selection circuits, a previous data transmission selection circuit sends the previous switching status data pertaining to its selected path to the next data transmission selection circuit, thereby allowing the next data transmission selection circuit to select another switching status.

The data transmission selection circuits are connected in sequence, such that the next data transmission selection circuit can be directly switched to the next switching status.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION

Figure 1:
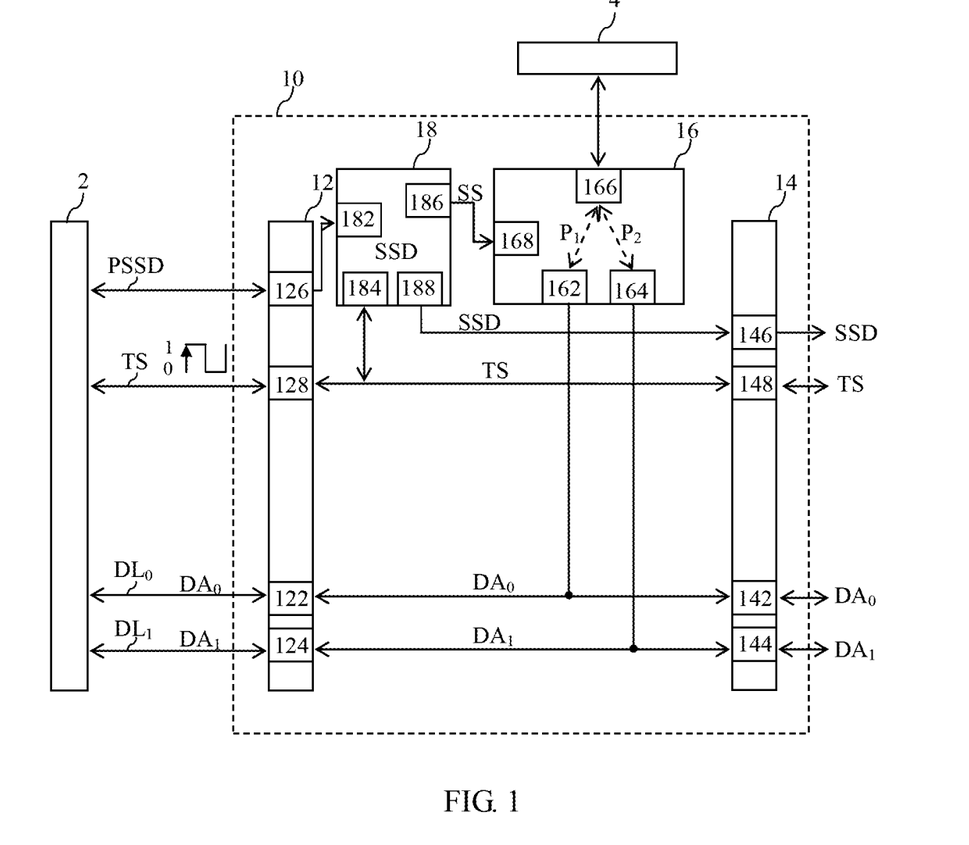
FIG. 1 is a schematic view of a data transmission selection circuit according to the first embodiment of the present invention.

Referring to FIG. 1, there is shown a schematic view of a data transmission selection circuit 10 according to the first embodiment of the present invention. As shown in FIG. 1, the data transmission selection circuit 10 selects one of a plurality of data transmission lines $DL_0$, $DL_1$ in order to transmit data $DA_0$, $DA_1$ between a mother system 2 and a daughter system 4 by the data transmission lines $DL_0$, $DL_1$, respectively. The data transmission lines $DL_0$, $DL_1$ comply with Universal Serial Bus (USB) communication protocol or Serial Advanced Technology Attachment (SATA) communication protocol.

The data transmission selection circuit 10 comprises an inputting module 12, an outputting module 14, a switching unit 16, and a processing unit 18.

The inputting module 12 has a plurality of first input ports 122, 124, a first detection port 126, and a first data port 128. The first input ports 122, 124 connect to the data transmission lines $DL_0$, $DL_1$ so as to receive the data $DA_0$, $DA_1$, respectively. The first detection port 126 receives a previous switching status data PSSD. The first data port 128 receives a trigger signal TS.

The previous switching status data PSSD is defined as being indicative of the state in which the previous data transmission selection circuit (not shown) has selected one of the data transmission lines $DL_0$, $DL_1$. Hence, by making reference to the previous switching status data PSSD, the data transmission selection circuit 10 can evaluate the availability of the data transmission lines, that is, whether the data transmission lines is in use or available. Hence, the previous switching status data PSSD serves as the criterion against which the data transmission selection circuit 10 determines which one of the data transmission lines $DL_0$, $DL_1$ to select.

The trigger signal TS is defined as the signal required for analyzing the previous switching status data PSSD by the processing unit 18. For example the trigger signal TS can take on a square waveform, wherein, if the processing unit 18 is rising edge-triggered, the processing unit 18 will be triggered to start analyzing the previous switching status data PSSD as soon as the square waveform of the trigger signal TS switches from level 0 to level 1.

Although this embodiment is exemplified by one and only one said data transmission selection circuit 10 and thus lacks the aforesaid previous data transmission selection circuit, the mother system 2 allows the data transmission selection circuit 10 to select the previous switching status data PSSD of the data transmission line $DL_0$ in order to allow the data transmission selection circuit 10 to select one of the data transmission lines $DL_0$, $DL_1$.

The outputting module 14 has a plurality of first output ports 142, 144, a second detection port 146, and a second data port 148. The first output port 142 and the first input port 122 are connected. The first output port 144 and the first input port 124 are connected. The second data port 148 and the first data port 128 are connected.

The switching unit 16 has a plurality of second input ports 162, 164, a second output port 166, and a selection port 168. For example, the switching unit 16 comes in the form of a multiplexer. Paths $P_1$, $P_2$ are created between the second output port 166 and the second input port 162, and between the second output port 166 and the second input port 164, respectively. The path $P_1$ is defined as an electrical wiring required for transmission of the data $DA_0$ between the daughter system 4 and the first output port 142 by the switching unit 16, wherein the electrical wiring is enabled by the connection of the second input port 162 and the second output port 166 of the switching unit 16. The path $P_2$ is defined as an electrical wiring required for transmission of the data $DA_1$ between the daughter system 4 and the second output port 144 by the switching unit 16, wherein the electrical wiring is enabled by the connection of the second input port 164 and the second output port 166 of the switching unit 16.

The processing unit 18 selects one of the paths $P_1$, $P_2$ according to a switching signal SS received by the selection port 168. The switching signal SS is a control signal required for the switching unit 16 to switch between the paths $P_1$, $P_2$, for example, between the electrical wiring enabled by the connection of the second input port 162 and the second output port 166 and the electrical wiring enabled by the connection of the second input port 164 and the second output port 166, wherein the switching signal SS exercises control by means of a high voltage level (for example, for selecting the path $P_1$) and a low voltage level (for example, for selecting the path $P_2$).

For example, the quantity of the second input ports 162, 164 is not less than (larger than or equal to) the quantity of the first input ports 122, 124 and/or the quantity of the first output ports 142, 144. The quantity of the paths $P_1$, $P_2$ created between the second input ports 162, 164 and the second output port 166 is equal to the quantity of the second input ports 162, 164.

The processing unit 18 has a receiving terminal 182, a data terminal 184, a control terminal 186, and an output terminal 188. The receiving terminal 182 and the first detection port 126 are connected. The data terminal 184 and the first data port 128 are connected. The control terminal 186 and the selection port 168 are connected. The output terminal 188 and the second detection port 146 are connected.

After the data terminal 184 has received the trigger signal TS, the processing unit 18 analyzes the previous switching status data PSSD at the receiving terminal 182 with an algorithm (not shown), so as to determine a switching status data SSD different from the previous switching status data PSSD. The processing unit 18 generates the switching signal SS according to the switching status data SSD and sends the switching signal SS to the control terminal 186. The processing unit 18 also sends the switching status data SSD to the output terminal 188 to thereby enable the next data transmission selection circuit (not shown) to perceive that the processing unit 18 has selected one of the paths $P_1$, $P_2$.

The processing unit 18 selects one of the paths $P_1$, $P_2$ according to the previous switching status data PSSD. The selected one of the paths $P_1$, $P_2$ is different from the path selected by the previous data transmission selection circuit. The switching status data SSD of the path $P_1$ or the path $P_2$ selected by the processing unit 18 is then sent to the next data transmission selection circuit, such that the next data transmission selection circuit selects a path different from the one selected by the data transmission selection circuit 10.

To enable the mother system 2 to expand the daughter system 4, the data transmission selection circuit 10 selects one of the data transmission lines $DL_0$, $DL_1$, such that the mother system 2 is connected to the daughter system 4, thereby enabling transmission of the data $DA_0$, $DA_1$, respectively.

Hence, the present invention is characterized in that, with the algorithm, and by making reference to the previous switching status data PSSD, the processing unit 18 identifies the status of a path selected by the previous data transmission selection circuit (exemplified by a mother system in this embodiment), and selects one of the paths $P_1$, $P_2$ according to the switching status data SSD. For example, if the processing unit 18 selects the path $P_1$, the processing unit 18 will send the switching status data SSD of the path $P_1$ to the next data transmission selection circuit.

In an embodiment where multiple data transmission selection circuits are connected in series, each data transmission selection circuit provides its switching status data SSD to the mother system 2 by means of the data. terminal 184 of the processing unit 18. The mother system 2 determines which one of the daughter systems is connected to a corresponding one of the data transmission selection circuits according to the switching status data SSD.

Figure 2:
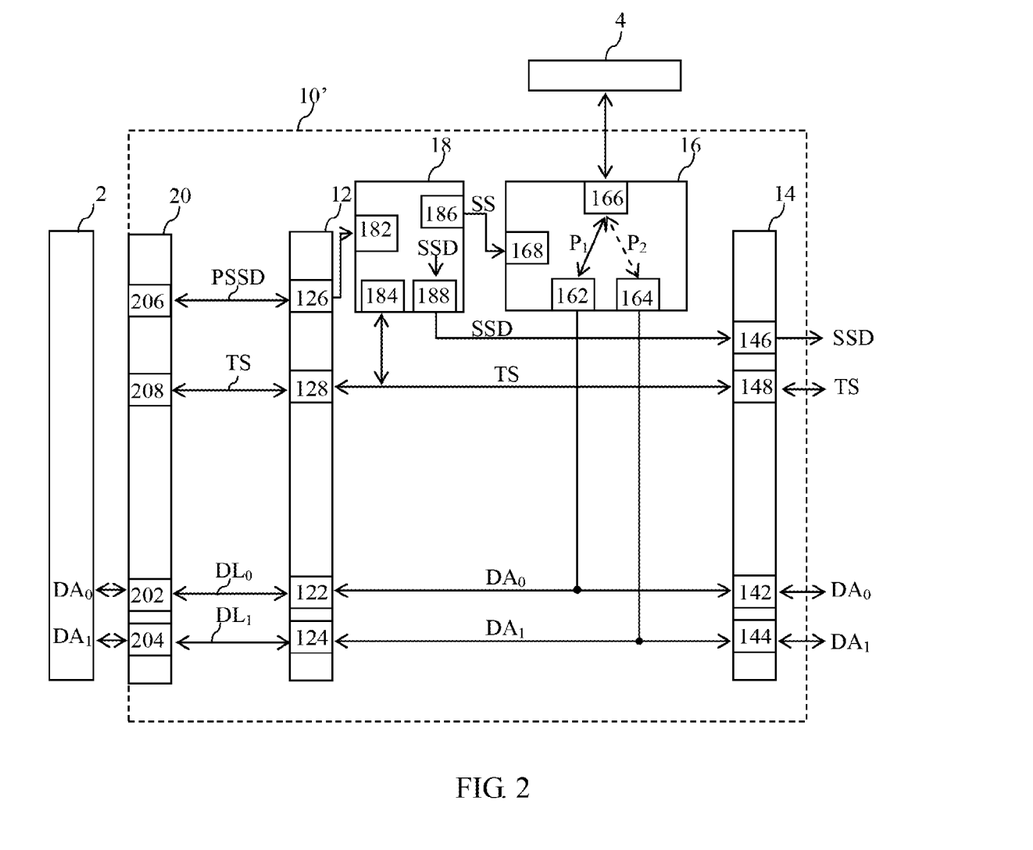
FIG. 2 is a schematic view of a data transmission selection circuit according to the second embodiment of the present invention.

Referring to FIG. 2, there is shown a schematic view of a data transmission selection circuit according to the second embodiment of the present invention. As shown in FIG. 2, a data transmission selection circuit 10' not only comprises the inputting module 12, the outputting module 14, the switching unit 16 and the processing unit 18 in the first embodiment, but also comprises a precedence module 20.

The precedence module 20 is disposed between the mother system 2 and the data transmission selection circuit 10'.

The precedence module 20 has a plurality of third input ports 202, 204 and a data generating unit 206. The third input ports 202, 204 of the precedence module 20 connect the first input ports 122, 124 and the mother system 2, respectively. The data generating unit 206 creates the previous switching status data PSSD and generates the trigger signal TS. The processing unit 18 generates the switching signal SS according to the previous switching status data PSSD. The switching signal SS is used in driving the switching unit 16 to switch to a predetermined path. In this embodiment, the predetermined path is the path $P_1$ defined by the connection of the second input port 162 and the second output port 166.

Figure 3:
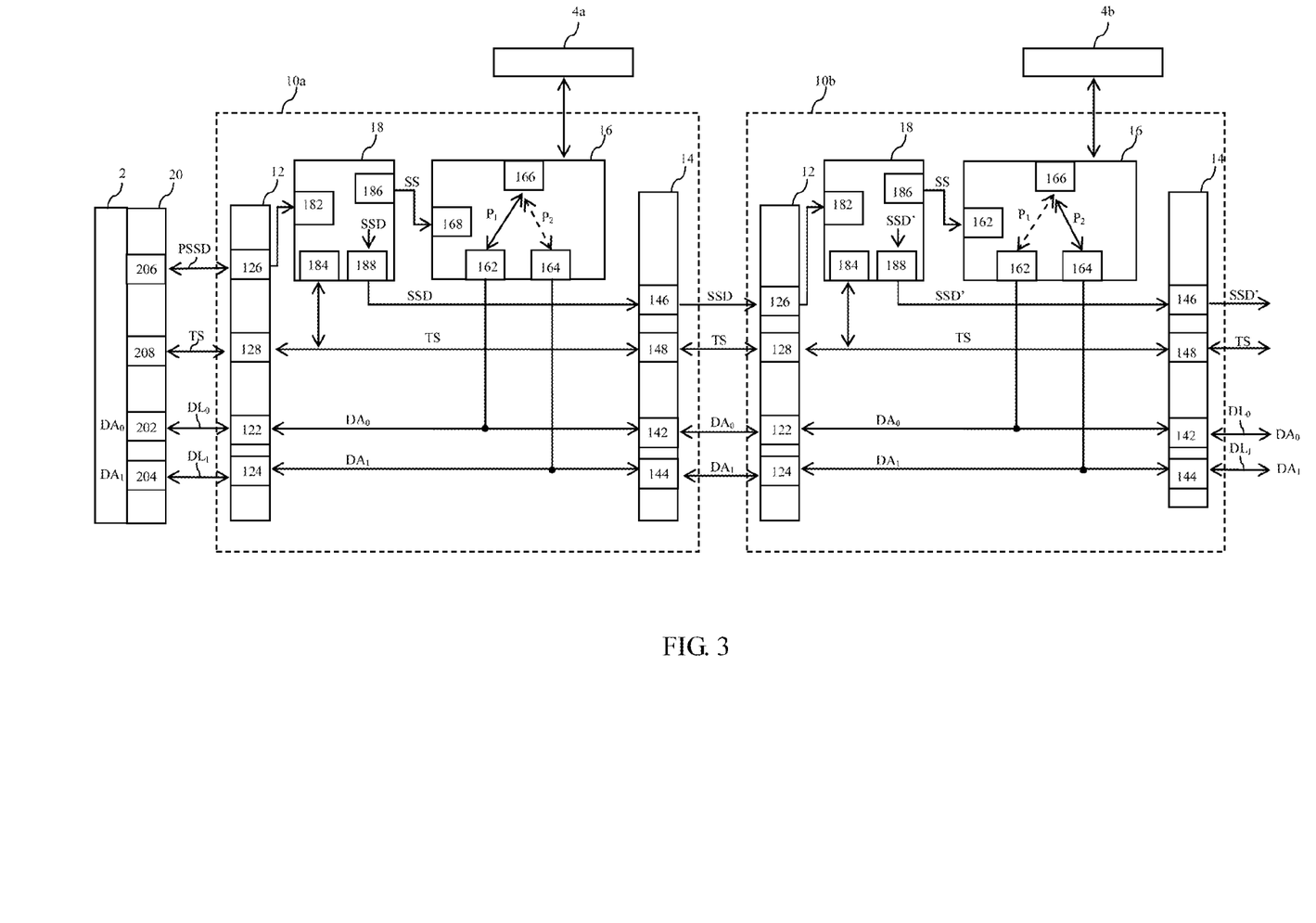
FIG. 3 is a schematic view of data transmission performed with a plurality of data transmission selection circuits according to the present invention.

Referring to FIG. 3, there is shown a schematic view of data transmission performed with a plurality of data. transmission selection circuits according to the present invention. As shown in FIG. 3, data transmission selection circuits 10a, 10b select one of data transmission lines $DL_0$, $DL_1$ to thereby transmit data $DA_0$, $DA_1$ between the mother system 2 and a plurality of daughter systems 4a, 4b by the data transmission lines $DL_0$, $DL_1$, respectively. The mother system 2 creates the data $DA_0$, $DA_1$. The mother system 2 is connected to the data transmission selection circuit 10a by two said data transmission lines $DL_0$, $DL_1$. In this embodiment, the data transmission selection circuits 10a, 10b are in the number of two, for the sake of illustration. The components of each of the data transmission selection circuits 10a, 10b in FIG. 3 are identical to that of the data transmission selection circuit 10 in FIG. 1. In this embodiment, the data transmission selection circuits 10a, 10b each have the inputting module 12, the outputting module 14, the switching unit 16, and the processing unit 18. The data transmission selection circuits 10a, 10b are connected in series by the inputting module 12 and the outputting module 14.

Furthermore, the precedence module 20 is connected between the mother system 2 and the data transmission selection circuit 10a, such that the data $DA_0$, $DA_1$ created by the mother system 2 can be sent to the data transmission selection circuit 10a via the precedence module 20 and the data transmission lines $DL_0$, $DL_1$, respectively.

Furthermore, the precedence module 20 creates the previous switching status data PSSD and generates the trigger signal TS. The processing unit 18 generates the switching signal SS according to the previous switching status data PSSD. The switching signal SS drives the switching unit 16 to switch directly to the path $P_1$, wherein the path $P_1$ is defined as an electrical wiring that connects the second input port 164a and the second output port 166.

Given the aforesaid connection configuration, once the mother system 2 connects to the precedence module 20 and the data transmission selection circuit 10a, the data $DA_0$, $DA_1$ created by the mother system 2 are sent to the third input ports 202, 204 of the precedence module 20 and the first input ports 122, 124 of the data transmission selection circuit 10a by the data transmission lines $DL_0$, $DL_1$, respectively.

The data transmission selection circuit 10a not only receives the data $DA_0$, $DA_1$ from the precedence module 20, but also receives the previous switching status data PSSD and the trigger signal TS via the first detection port 126 and the first data port 128, respectively.

In the data transmission selection circuit 10*a*, after the processing unit 18 has received the trigger signal TS, the processing unit 18 analyzes the previous switching status data PSSD at the receiving terminal 182 and determines the path $P_1$ by means of an algorithm.

With the data transmission selection circuit 10*a* being directly connected to the precedence module 20, the processing unit 18 treats the previous switching status data PSSD directly as the switching status data SSD, and the processing unit 18 generates the switching signal SS according to the switching status data SSD; hence, after receiving the switching signal SS, the switching unit 16 of the data transmission selection circuit 10*a* selects the path $P_1$. With the path $P_1$ being selected by the switching unit 16, the data $DA_0$ is sent via the path $P_1$ to the daughter system 4*a* in connection with the second output port 166.

Furthermore, the processing unit 18 sends the switching status data SSD to the second detection port 146.

In the data transmission selection circuit 10*b*, after the processing unit 18 has received the trigger signal TS, the processing unit 18 receives the switching status data SSD and determines, by means of an algorithm, that the path $P_1$ in the switching unit 16 of the data transmission selection circuit 10*a* has been selected by the processing unit. That is to say, the processing unit 18 of the data transmission selection circuit 10*b* selects the path $P_2$ over the path $P_1$ related to the switching status data SSD and creates another switching status data SSD' according to the path $P_2$; meanwhile, the switching unit 16 executes the switching to the path $P_2$ according to the switching status data SSD', such that the data $DA_1$ is sent via the path $P_2$ to the daughter system 4*b* connected with the second output port 166.

The processing unit 18 of the data transmission selection circuit 10*b* sends the switching status data SSD' to the second detection port 146 of the data transmission selection circuit 10*b*.

Figure 4:
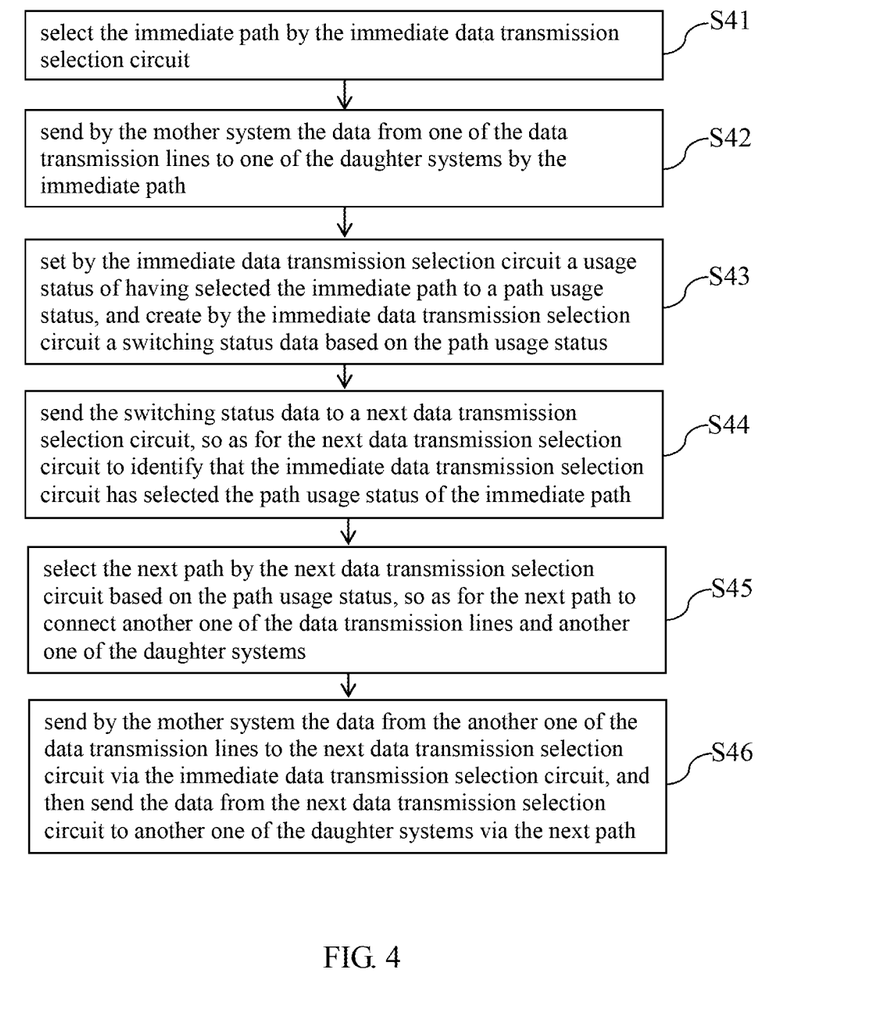
FIG. 4 is a flow chart of a data transmission selection method according to the first embodiment of the present invention.

Referring to FIG. 4, there is shown a flow chart of a data transmission selection method according to the first embodiment of the present invention. As shown in FIG. 4, the data transmission selection method is characterized in that connection of an immediate data transmission selection circuit and a next data transmission selection circuit enables selection of one of a plurality of data transmission lines and thereby transmission of data between a mother system and a plurality of daughter systems by the selected data transmission line, wherein the data transmission selection circuits being defined with an immediate path and a next path.

The data transmission selection method begins with step S41 which involves selecting the immediate path by the immediate data transmission selection circuit to thereby connect one of the data transmission lines and one of the daughter systems by the immediate path.

Step S42 involves sending by the mother system the data from one of the data transmission lines to one of the daughter systems by the immediate path.

Step S43 involves setting by the immediate data transmission selection circuit a usage status of having selected the immediate path to a path usage status, and creating by the immediate data transmission selection circuit a switching status data based on the path usage status.

Step S44 involves sending the switching status data to a next data transmission selection circuit, so as for the next data transmission selection circuit to identify that the immediate data transmission selection circuit has selected the path usage status of the immediate path. In another embodiment, the next data transmission selection circuit starts the immediate data transmission selection circuit and the next data transmission selection circuit by a trigger signal to thereby begin judging the switching status data. For example, the trigger signal comes in the form of a square wave signal which is sent to the immediate data transmission selection circuit and the next data transmission selection circuit simultaneously to trigger the immediate data. transmission selection circuit and the next data transmission selection circuit, respectively.

In this embodiment, step S45 involves selecting the next path by the next data transmission selection circuit based on the path usage status, so as for the next path to connect another one of the data transmission lines and another one of the daughter systems.

Step S46 involves sending by the mother system the data from the another one of the data transmission lines to the next data transmission selection circuit via the immediate data transmission selection circuit, and then sending the data from the next data transmission selection circuit to another one of the daughter systems via the next path.

Figure 5:
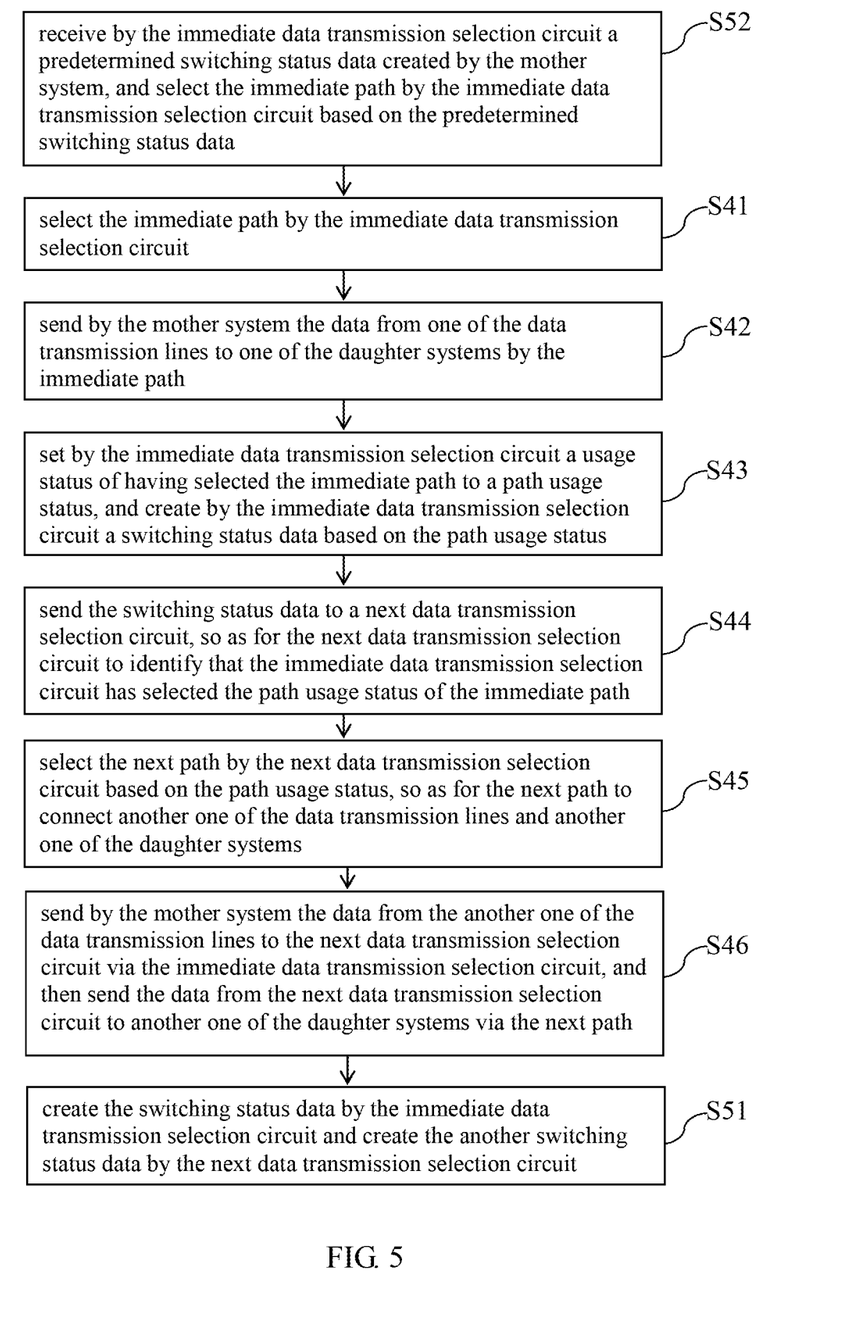
FIG. 5 is a flow chart of a data transmission selection method according to the second embodiment of the present invention.

Referring to FIG. 5, there is shown a flow chart of a data transmission selection method according to the second embodiment of the present invention. As shown in FIG. 5, the data transmission selection method in the second embodiment not only includes the same steps S41~S46 as disclosed in the first embodiment, but also includes step S51 and step S52.

Step S51 follows step S46 and involves sending to the mother system the switching status data created by the immediate data transmission selection circuit and the another switching status data created by the next data transmission selection circuit to thereby allow the mother system to not only identify that the immediate data transmission selection circuit has selected the immediate path and the next data transmission selection circuit has selected the next path but also identify that the immediate data transmission selection circuit has connected to one of the daughter systems via the immediate path and the next data transmission selection circuit has connected to another one of the daughter systems via the next path.

Step S52 precedes step S41 and involves receiving by the immediate data transmission selection circuit a predetermined switching status data created by the mother system upon connection of the immediate data transmission selection circuit and the mother system, and selecting the immediate path by the immediate data transmission selection circuit based on the predetermined switching status data.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A data transmission selection circuit for selecting one of a plurality of data transmission lines between a mother system and a daughter system and transmitting data by the selected transmission line, the data transmission selection circuit comprising:

an inputting module having a plurality of first input ports, a first detection port, and a first data port, the first input ports connecting to the data transmission lines, the first detection port receiving a previous switching status data, and the first data port receiving a trigger signal;

an outputting module having a plurality of first output ports, a second detection port, and a second data port, the first output ports connecting to the first input ports, respectively, and the second data port connecting to the first data port;

a switching unit having a plurality of second input ports, a second output port, and a selection port, wherein a plurality of paths are created between the second input ports and the second output port, the second input ports connecting to the first input ports, respectively, and the switching unit selecting one of the paths based on a switching signal received by the selection port; and a processing unit having a receiving terminal, a data terminal, a control terminal, and an output terminal, the receiving terminal connecting to the first detection port, the data terminal connecting to the first data port, the control terminal connecting to the selection port, and the output terminal connecting to the second detection port, wherein, after the data terminal has received the trigger signal, the processing unit analyzes the previous switching status data at the receiving terminal with an algorithm, so as to determine a switching status data different from the previous switching status data, wherein the processing unit generates the switching signal based on the switching status data and sends the switching signal to the control terminal, wherein the processing unit sends the switching status data to the output terminal, wherein the previous switching status data is indicative of a state required for a previous data transmission selection circuit or the mother system to select one of the paths, wherein the switching status data is indicative of a state required for a next data transmission selection circuit to identify another said path selected by the switching unit.

2. The data transmission selection circuit of claim 1 further comprising a precedence module having a plurality of third input ports and a data generating unit, the third input ports connecting to the first input ports and the mother system, the data generating unit generating the previous switching status data and the trigger signal, wherein the previous switching status data enables the processing unit to generate the switching signal for switching the switching unit to a predetermined path.

3. The data transmission selection circuit of claim 2, wherein a quantity of the second input ports is not less than at least one of a quantity of the first input ports and a quantity of the first output ports, and a quantity of the paths created between the second input ports and the second output ports is equal to the quantity of the second input ports.

4. The data transmission selection circuit of claim 3, wherein the first input ports, the first output ports, the second input ports, and the second output ports comply with one of Universal Serial Bus (USB) communication protocol and Serial Advanced Technology Attachment (SATA) communication protocol.

5. The data transmission selection circuit of claim 3, wherein, after analyzing the previous switching status data with the algorithm, the processing unit determines one of the paths based on an analysis result, selects another said path based on the analysis result, and creates another previous switching status data.

6. The data transmission selection circuit of claim 3, wherein the switching nit is a multiplexer.

7. A data transmission selection method, characterized in that connection of a data transmission selection circuit and a next data transmission selection circuit enables selection of one of a plurality of data. transmission lines and thereby transmission of data between a mother system and a plurality of daughter systems by the selected data transmission line, the data transmission selection circuits each being defined with an immediate path and a next path, the method comprising the steps of:

selecting the immediate path by the immediate data transmission selection circuit to thereby connect one of the data transmission lines and one of the daughter systems by the immediate path;

sending by the mother system the data from one of the data transmission lines to one of the daughter systems by the immediate path;

setting by the immediate data transmission selection circuit a usage status of having selected the immediate path to a path usage status, and creating by the immediate data transmission selection circuit a switching status data based on the path usage status;

sending the switching status data to the next data transmission selection circuit, so as for the next data transmission selection circuit to identify that the immediate data transmission selection circuit has selected the path usage status of the immediate path;

selecting the next path by the next data transmission selection circuit based on the path usage status, so as for the next path to connect another one of the data transmission lines and another one of the daughter systems, wherein the next data transmission selection circuit sets a usage status of having selected the next path to another path usage status, the next data transmission selection circuit creates another switching status data based on the another path usage status; and sending by the mother system the data from the another one of the data transmission lines to the next data transmission selection circuit via the immediate data transmission selection circuit, and then sending the data from the next data transmission selection circuit to another one of the daughter systems via the next path.

8. The data transmission selection method of claim 7, further comprising the step of sending to the mother system the switching status data created by the immediate data transmission selection circuit and the other switching status data created by the next data transmission selection circuit.

9. The data transmission selection method of claim 7, further comprising the step of receiving by the immediate data transmission selection circuit a predetermined switching status data created by the mother system upon connection of the immediate data transmission selection circuit and the mother system, and then selecting by the immediate data transmission selection circuit the immediate path based on the predetermined switching status data.

10. The data transmission selection method of claim 7, further comprising the step of starting the immediate data transmission selection circuit and the next data transmission selection circuit by a trigger signal to begin identifying the path usage status indicated by the switching status data.

11. The data transmission selection method of claim 10, wherein the trigger signal is presented in form of a square wave signal and sent to the immediate data transmission selection circuit and the next data transmission selection circuit to thereby trigger the immediate data transmission selection circuit and the next data transmission selection circuit.

* * * * *